B. T. BROWAND.
TOOL HOLDER.
APPLICATION FILED FEB. 14, 1921.
1,433,527. Patented Oct. 31, 1922.
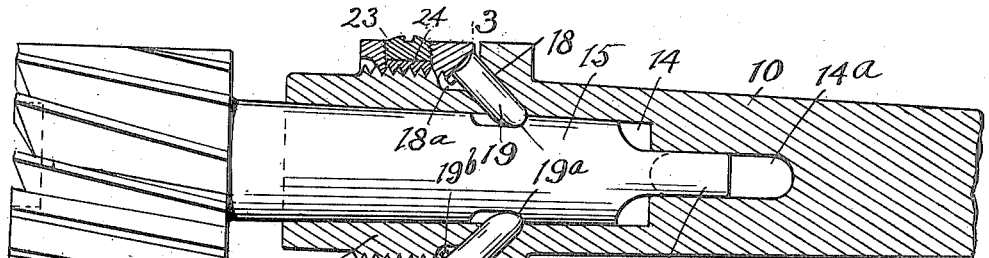
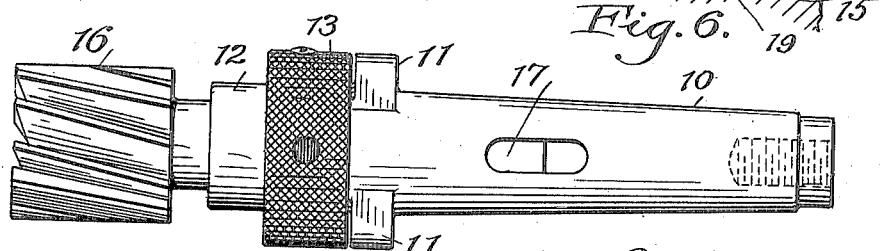
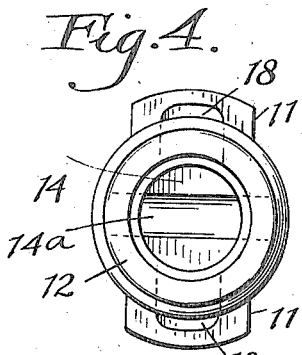
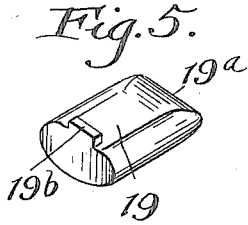
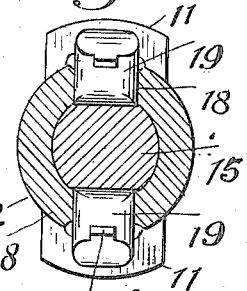
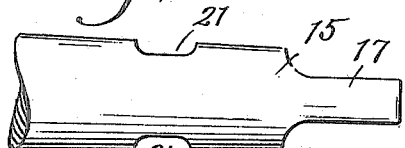
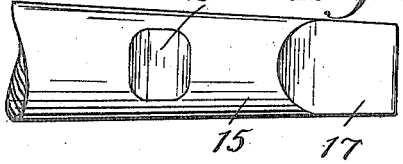
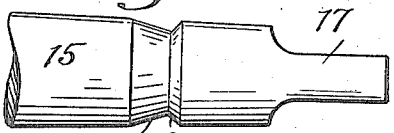
Inventor:
Benjamin T. Browand
by
Thurston Kwis & Hudson
attys.

Patented Oct. 31, 1922.

1,433,527

UNITED STATES PATENT OFFICE.

BENJAMIN T. BROWAND, OF CLEVELAND, OHIO.

TOOL HOLDER.

Application filed February 14, 1921. Serial No. 444,756.

*To all whom it may concern:*

Be it known that I, BENJAMIN T. BROWAND, a citizen of the United States, residing at Cleveland, in the county of Cuyahoga and State of Ohio, have invented a certain new and useful Improvement in Tool Holders, of which the following is a full, clear, and exact description.

This invention relates to a tool holder with special utility for milling machines, although not necessarily confined to such machines.

With certain machine tools the rotating part or spindle is provided with a taper socket, and the tool with a taper shank which is tightly driven into the socket so that the same will be held in place and driven or rotated during the cutting or machining operation. With many kinds of tools the tight fit of the taper shank into the taper socket is ample to hold the tool in place, but with certain other tools, such as milling machines, and particularly when driving a surfacing and end cutting tool, the cutting action has a tendency to pull the tool out of the socket. This often happens, frequently with serious results to the work and tool, breakage and destruction of the tool generally resulting. This is a matter of considerable consequence in view of the fact that the cutting part of the tool is generally formed of so-called high-speed steel, which, particularly at the present time, is exceedingly expensive. It sometimes happens also that the load on the tool is so great as to twist or break off the flat tang at the rear end of the tool.

It is one of the objects of the present invention to provide a holder of the taper socket type, with means for positively preventing during the cutting operation the accidental pulling of the taper shank from the socket. A further object is to provide additional means for resisting the turning of the tool in the taper socket and thus relieve the tang of part of the torsional stresses.

It is a further aim of the invention to accomplish the above mentioned object without requiring any change or material change, in the construction of the machine tool, and in such a way that the invention can be readily applied, if desired, to machine tools already built.

The invention may be briefly summarized as consisting in certain novel details of construction, and combinations and arrangements of parts which will be described in the specification and set forth in the appended claims.

In the accompanying sheet of drawings, Fig. 1 is a view partly in side elevation and partly in section, showing a holder constructed in accordance with my invention, the collet which receives the tool being in section; Fig. 2 is an elevation of the same on a slightly reduced scale; Fig. 3 is a sectional view substantially along the line 3—3 of Fig. 1, looking in the direction indicated by the arrow; Fig. 4 is an end view of the collet with the tool removed; Fig. 5 is a perspective view of one of the dogs utilized to assist in holding the tool in the collet; Fig. 6 is a fragmentary sectional view showing a slight modification in the way of preventing the dogs dropping from the collet; Figs. 7 and 8 are side views of the inner end of the tool shown in Fig. 1 to illustrate the flat bottom notches which are adapted to be engaged by the dogs when forced inward by a tightening ring; Fig. 9 is a similar view showing a tool with a continuous groove to receive the inner ends of the dogs instead of the separated flat bottom notches shown in Figs. 7 and 8.

In the accompanying sheet of drawings, 10 represents a tapered collet which is customarily employed to receive a tool such as a milling tool, and is adapted to be inserted in the rotating driving spindle of a machine tool such as a milling machine.

This collet is provided with the usual tapered body for insertion in the tapered socket of the spindle, and in this instance the collet is provided just forward of the tapered body with a pair of oppositely disposed lugs 11 which are adapted to be inserted in rectangular notches formed in the front end of the spindle and forward of these lugs the collet has an annular threaded portion 12 adapted to receive a locking ring 13, the purpose of which will be explained.

The collet has a tapered socket 14 which is designed to receive the tapered spindle 15 of a cutting tool 16, the rear or inner end of the shank 15 having the usual tang 17 which is received into the reduced end 14ª of the socket in the collet. In the drawing I have shown a so-called surfacing and end cutting tool with spiral cutting edges. With a tool of this kind there exists the before mentioned tendency of the tool to be pulled out of the socket during the cutting operation, this being ordinarily resisted solely by the frictional engagement between the tapered shank of the tool and the tapered wall or socket of the collet. Furthermore, the turning of the tool in the collet is ordinarily resisted almost entirely by the tang of the tool. But when the load on the tool becomes excessive it sometimes happens that this tang is twisted off. To prevent the tool, such as the one herein illustrated, being pulled out of the socket and to prevent the tang being broken off by a torsional load greater than the tang can sustain, I provide the present invention.

In the collet I provide two diagonally disposed openings 18, these openings being disposed at an angle of approximately 45° to the axis of the collet. The outer ends of these openings are in the forward sides of the lugs 11, or rather at the intersection of the inner faces of these lugs with the annular part of the collet forward of these lugs, the threaded portion adjacent these openings being preferably milled off as shown at 18ª. The inner ends of these openings 18 intersect the inner tapered surface of the collet forming the tapered socket 14.

In these diagonally disposed openings 18 tool holding dogs or plungers 19 are provided, these dogs being in the form of laterally elongated hardened steel members with inner tapered ends 19ª. The opposite faces of the dogs are flat and parallel, and their longitudinal edges are rounded so as to conform in shape to the cross sectional outline of the openings 18.

Any suitable means may be provided for preventing these dogs dropping into the socket of the collet when the tool is removed, and in Figs. 1, 3 and 5 the outer ends of the dogs are provided with lips 19ᵇ which serve this purpose. In the modification shown in Fig. 6 the lugs 11ª are provided with small screws 20 which extend from the back face of the lugs 11 diagonally inward at right angles to the dogs and engage in shallow elongated slots on the rear sides of the dogs.

In order that these dogs may hold the tool against being pulled from the socket of the collet, the shank of the tool is provided with appropriately shaped dog receiving recess or recesses, and if the dogs are to have the additional function of relieving the tang of part of the twisting or torsional stresses the dog receiving means of the tool shank consists of a pair of flat bottomed notches 21 oppositely disposed on opposite sides of the shank of the tool, and so located that when the tool is a full distance in the socket of the collet the inner ends of the dogs will engage and may be forced up against the rear or inner portions of these flat notches precisely as shown in Fig. 1.

Instead of providing the shank of the tool with flat notches 21 for the purpose stated, it may be provided with a continuous groove 22 substantially as shown in Fig. 9, in which event the inner ends of the dogs will bear against the rear face 22ª of this groove.

Referring now again to the ring 13 forming a part of my improved construction, it will be observed that the rear end of the ring is tapered at an angle of 45°, so that when the ring is screwed back towards the lugs 11 the tapered rear edge of the ring will engage the outer protruding ends of the dogs 19, and will force them inward with a pressure exerted longitudinally of the dogs.

Before the tool is inserted in the collet the ring will be backed away somewhat so as to permit the tapered shank of the tool to be inserted in the usual fashion. When the tool has been inserted the full distance, it is only necessary to screw back the ring 13 with a spanner wrench or other suitable tool, or by hand if desired, and the effect of this ring is to force the dogs inward and cause their inner ends to bear solidly against the rear tapered portions of the oppositely disposed notches 21, in the event the notches are utilized, or against the rear tapered portion of the annular groove, in the event the groove of Fig. 9 is utilized. Therefore, these dogs will prevent entirely the accidental withdrawal of the tool from the socket, and when the tool is provided with the flat bottomed notches of Figs. 7 and 8, they additionally sustain part of the torsional load transmitted from the tool to the collet and thus relieve the tang of a portion of the stresses which it would otherwise be required to bear. Therefore, this tool can be used under maximum load without liability either of the tool coming out of the collet or of a tang being broken off.

When it is desired to remove the tool from the collet the ring 13 is loosened up so as to allow of sufficient freedom of movement of the dogs to permit the tool being driven out by the usual drift pin or tool.

In the event it is desired to tightly clamp the ring 13 in place, I may provide a set screw 23 such as shown in Fig. 1, in which event I prefer to provide at the bottom of the tapped opening which receives the screw, a plug 24 whose inner surface is threaded in conformity with the threading on the inner surface of the ring. When the set screw 23 and the plug 24 are provided, by tightening down on the set screw, the ring 13 can be locked in place. However, I do not regard the use of the set screw 23 and plug 24 as essential to the invention, though it can be employed if desired.

It will be seen therefore, that I have provided an improvement of considerable merit in machine tools, particularly milling tools, and that the objects stated at the beginning of the specification are attained very effectively with the construction herein illustrated.

Having described my invention, I claim:

1. A rotatable tool holder having a taper socket, a tool having a taper shank adapted to be driven into the socket and provided with a recess having a shoulder, the holder having a diagonally disposed endwise movable dog or plunger together with means for forcing the dog or plunger inwardly so as to cause its inner end to engage the shoulder.

2. A tool holder having a taper socket and a tool having a taper shank fitted into the socket and provided between its ends with one or more shouldered seats, and the holder having at the end in which the shank is inserted, a threaded portion, a nut engaging said threaded portion, and a plurality of movable plungers extending diagonally through the holder and so disposed that they will be moved inward by said nut so that each will engage the shoulder of the seat or seats of the tool when the latter is in the socket.

3. A rotatable tool holder having a taper socket, a tool and a taper shank adapted to be inserted in the socket and provided with a pair of oppositely disposed recesses having shoulders, and means for preventing the tool being accidentally withdrawn from the socket and for carrying part of the torsional stresses transmitted from the tool to the holder, comprising a pair of diagonally disposed dogs or plungers mounted in the holder and adapted at their inner ends to engage said shoulders of the recesses of the tool, and means for forcing said dogs or plungers inwardly against said shoulders.

4. A rotatable tool holder having a taper socket in combination with a tool having a taper shank adapted to be driven into the taper socket and provided with recesses having flat faces and shoulders, said holder having near its end a threaded portion, a nut engaging said threaded portion, and diagonally disposed plungers or dogs extending diagonally inward to the taper socket of the holder, said plungers being so disposed that when engaged and forced inward by the nut their inner ends will engage the flat faces and shoulders of the recesses of the shank of the tool.

5. A rotatable tool holder having a taper socket, a tool having a taper shank adapted to be driven into the socket and provided with a pair of inclined shoulders, the holder being provided with a pair of plungers movable in lines substantially at right angles to said inclined shoulders, and the holder having near its outer end a nut whose inner end is tapered at substantially right angles to said plungers and adapted to engage the outer ends of the plungers to move them inward and force them solidly against said shoulders.

In testimony whereof, I hereunto affix my signature.

BENJAMIN T. BROWAND.